US008014329B2

(12) United States Patent
Gong

(10) Patent No.: US 8,014,329 B2
(45) Date of Patent: Sep. 6, 2011

(54) PATH SELECTION AND POWER MANAGEMENT IN MESH NETWORKS

(75) Inventor: Xiaohong Gong, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 869 days.

(21) Appl. No.: 11/956,750

(22) Filed: Dec. 14, 2007

(65) Prior Publication Data

US 2009/0010190 A1 Jan. 8, 2009

Related U.S. Application Data

(60) Provisional application No. 60/947,774, filed on Jul. 3, 2007.

(51) Int. Cl.
*G08C 17/00* (2006.01)
(52) U.S. Cl. ..... 370/311; 370/338; 370/328; 455/343.5; 340/7.33; 340/7.37
(58) Field of Classification Search ............ 370/311
See application file for complete search history.

(56) References Cited

U.S. PATENT DOCUMENTS

| | | | | |
|---|---|---|---|---|
| 5,987,011 A * | 11/1999 | Toh | | 370/331 |
| 6,873,839 B2 * | 3/2005 | Stanforth | | 455/343.2 |
| 7,266,085 B2 * | 9/2007 | Stine | | 370/252 |
| 7,295,827 B2 * | 11/2007 | Liu et al. | | 455/343.2 |
| 7,428,229 B2 * | 9/2008 | Bonta et al. | | 370/338 |
| 7,668,146 B2 * | 2/2010 | Levendel et al. | | 370/338 |
| 2002/0006805 A1 * | 1/2002 | New et al. | | 455/525 |
| 2004/0088589 A1 * | 5/2004 | Westerinen et al. | | 713/300 |
| 2004/0153676 A1 * | 8/2004 | Krantz et al. | | 713/300 |
| 2006/0270408 A1 * | 11/2006 | Kobayashi et al. | | 455/440 |

OTHER PUBLICATIONS

PCT/US2008/068311, Notification of Transmittal of the International Search Report and the Written Opinion of the International Searching Authority, or the Declaration, European Patent Office, Dec. 2, 2008.
Zheng, R. et al., On-demand power management for ad hoc networks, Ad Hoc Networks, Elsevier, vol. 3, No. 1, pp. 51-68, XP004645830, Nov. 26, 2003.
Zheng, R. et al., Asynchronous wakeup for ad hoc networks, Proceedings of the 4th ACM International Symposium on Mobile Ad Hoc Networking & Computing, pp. 35-45, XP002503722, 2003.
Office Action for European Patent Application No. 08781008.1, May 11, 2010.
Perkins, C., et al., "Ad hoc On-Demand Distance Vector (AODV) Routing", Network Working Group, Request for Comments No. 3561, Jul. 2003.
Clausen, T., Ed., et al., "Optimized Link State Routing Protocol", Network Working Group, Request for Comments No. 3626, Oct. 2003.

* cited by examiner

*Primary Examiner* — Ian N Moore
*Assistant Examiner* — Dung B Huynh
(74) *Attorney, Agent, or Firm* — Baker Botts L.L.P.

(57) ABSTRACT

A two-phased path selection process for wireless mesh networks that promotes stability and power management. If, during a first route discovery phase, a route cannot be found without waking up battery-powered nodes in a wireless mesh network, the source node will wake up battery-powered nodes in the mesh during a second route discovery phase.

22 Claims, 5 Drawing Sheets

PATH SELECTION AND POWER MANAGEMENT IN MESH NETWORKS

CROSS-REFERENCE TO RELATED APPLICATION

The present application claims priority to U.S. Provisional Application Ser. No. 60/947,774, filed Jul. 3, 2007, the entire disclosure of which is incorporated by reference herein.

TECHNICAL FIELD

This disclosure relates generally to wireless mesh networks.

BACKGROUND

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

Wireless mesh networks have become increasingly popular. A typical wireless mesh network consists of mesh access points (e.g., Cisco® Aironet® mesh access points) and wireless clients. To construct self-forming and self-healing multi-hop wireless mesh networks, each mesh access point finds a route back to a root node. The routing protocols used by the mesh access points generally form a hierarchical routing configuration, according to which backhaul traffic is forwarded between a root node and multiple mesh access points. The IEEE 802.11s standard defines a default routing protocol (Hybrid Wireless Mesh Protocol, or HWMP), yet allows vendors to operate using alternate protocols. Wireless mesh networks can include one or more mesh access points (mesh APs or MAPs) including a backhaul radio for transmission of traffic across the mesh backhaul between other mesh nodes, and a client radio for wireless client traffic.

Power saving and power management is often an aspect of portable devices, which typically are battery-powered. A wireless device can operate in either doze state or active state. Doze state is sometimes called Power Save (PS) state. Within the active state, there are three power consumption modes: Idle Mode, Receive Mode, and Transmit Mode. In a Power Save state, a wireless device wakes up at beacon frame intervals to determine whether there is any wireless traffic destined for it. If not, the wireless device turns off its radio to save power. Measurements show that devices in the power stave state consume significantly less power than in active state. It has been shown via implementation that allowing devices to go into doze state and only wake up periodically to synchronize and to check for their own wireless can reduce power consumption.

DESCRIPTION OF EXAMPLE EMBODIMENTS

A. Overview

Particular embodiments facilitate the implementation of path selection mechanisms in wireless mesh networks. As currently defined in the IEEE 802.11s standard, the power management function and the path selection function are two independent functions with no interaction. The route discovery scheme introduced here bridges the gap between power management and path selection in wireless mesh networks to promotes packet delivery reliability and network stability, while reducing power consumption. In a particular implementation, a two-phased path selection process is set forth. If, during a first route discovery phase, a route cannot be found without waking up battery-powered nodes in a wireless mesh network, the source node will wake up battery-powered nodes in the mesh during a second route discovery phase.

B. Example Wireless Mesh Network System Architecture

B.1. Network Topology

Figure 1:
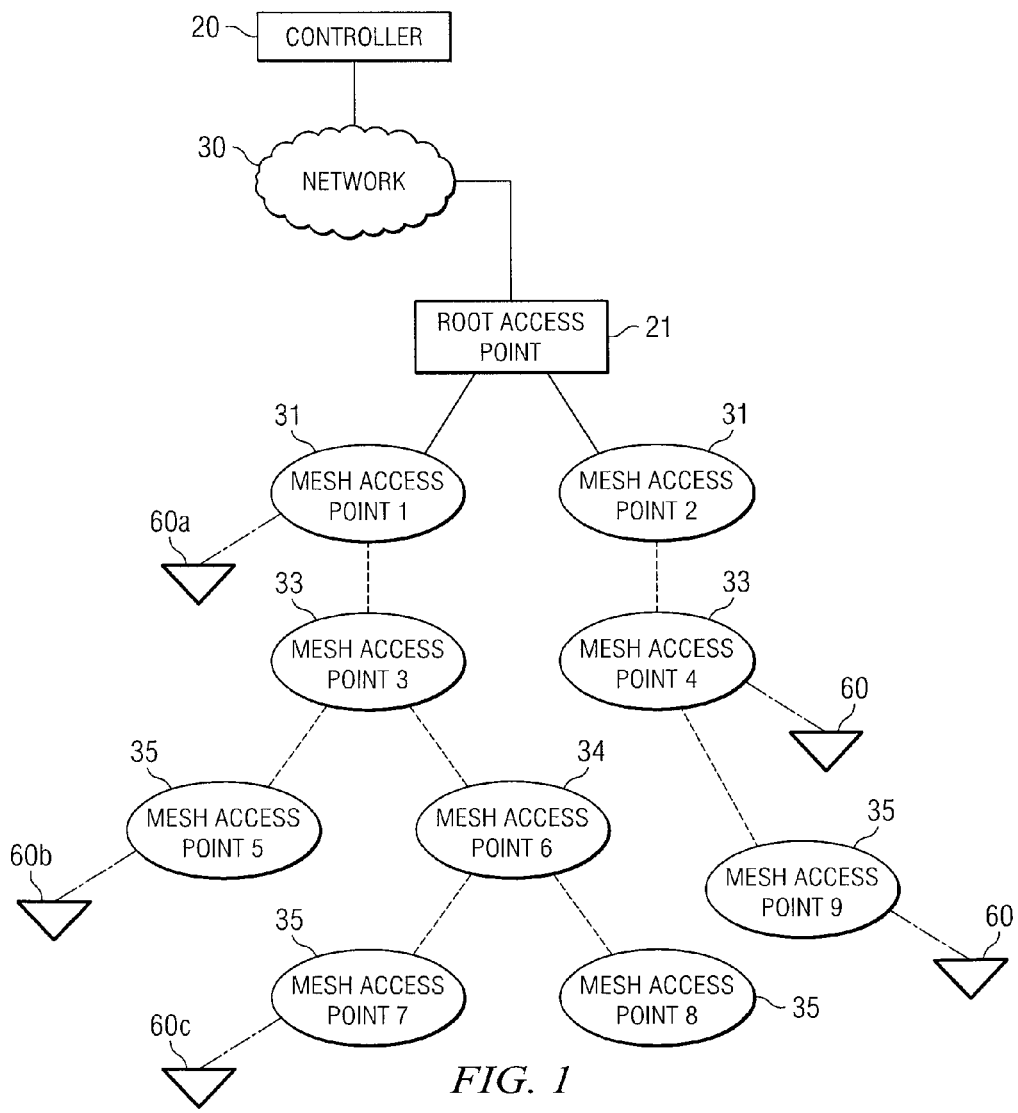
FIG. 1 illustrates an example topological diagram of a hierarchical wireless mesh network.

FIG. 1 illustrates a wireless mesh network according to one implementation of the present invention. In one implementation, the wireless mesh network includes a wireless mesh controller 20, a root access point 21, and a plurality of child wireless mesh access points. In one implementation, the mesh access points are logically arranged in a hierarchy for purposes of routing traffic to the root access point (RAP), and on to a network. In one implementation, this hierarchy can be dynamically configured and shifted based on discovery of wireless management messages between wireless mesh access points.

In one implementation, a hierarchical architectural overlay is imposed on the mesh network of routing nodes to create a downstream direction towards leaf routing nodes 35, and an upstream direction toward the root access point 21. For example, in the hierarchical mesh network illustrated in FIG. 1, first hop mesh access point 31 is the parent of intermediate mesh access point 33. In addition, intermediate mesh access points 33 and 34 are the parent to leaf mesh access point 35. In one implementation, this hierarchical relationship is used in routing packets between wireless clients 60, or between wireless clients 60 and network 30. Of course, a variety of wireless mesh network configurations are possible, including non-hierarchical configurations, and hierarchical configurations with fewer or greater number of hierarchical tree structures.

The mesh access points in the mesh network, in one implementation, generally include one radio, operating in a first frequency band, and associated wireless communication functionality to communicate with other mesh access points to thereby implement the wireless backbone, as discussed more fully below. All or a subset of the mesh access points, in one implementation, also include an additional radio, operating in a second, non-interfering frequency band, and other wireless communication functionality to establish and maintain wireless connections with mobile stations, such as wireless client 60. For example, in 802.11 wireless networks, the backbone radios on the wireless routing nodes may transmit wireless packets between each other using the 802.11a protocol on the 5 GHz band, while the second radio on each mesh access point may interact with wireless clients on the 2.4 GHz band (802.11b/g). Of course, this relation can also be reversed with backhaul traffic using the 802.11b/g frequency band, and client traffic using the 802.11a band. In addition, the mesh access points may include only a single radio or additional radios.

In one implementation, some wireless mesh networks can include a controller and a plurality of mesh access points that are configured into one or more routing and control hierarchies based on automatic neighbor and route discovery protocols. In some environments, individual mesh access points automatically discover their neighbors and configure hierarchical routing configurations by selecting parent nodes based on a variety of factors. Mesh access points, in some systems, connect to a wireless controller through one or more parents nodes in the routing hierarchy.

With the introduction of outdoor mesh networks and limited power availability after disasters and in many parts of the world, power saving is becoming an aspect of wireless mesh access points. For instance, some mesh access points can be powered by solar panels that charge a battery or other rechargeable power supply. Currently, however, many mesh access points operate without built-in power saving mechanisms, which means they operate in active state all the time regardless of whether there is traffic to forward. Thus, battery life for the batteries powering these wireless mesh nodes may often reach a critical state. However, given the self-forming and self-healing nature of mesh networks, a device in doze state can be woken up to participate in the mesh network again. Therefore, when a mesh access point does not send or receive packets, it does not need to be in the active state. By utilizing a power saving mechanism, a mesh access point can extend its battery life much longer and/or rely on a smaller solar panel for its operation, allowing for reductions in product size and cost.

B.2. Controller

Figure 2A:
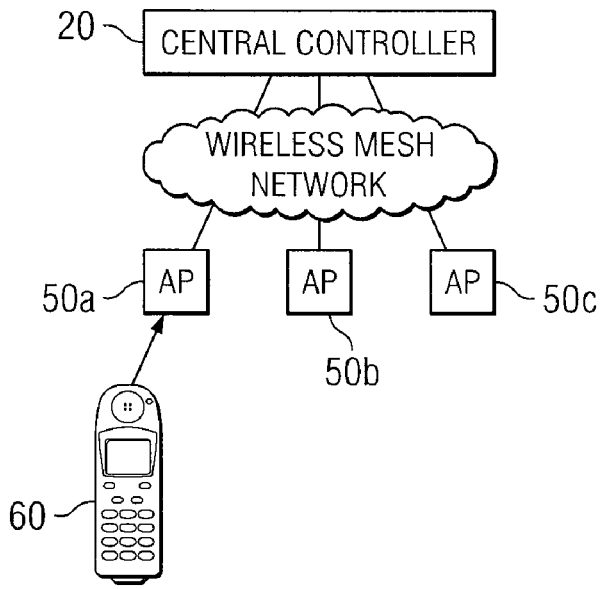
FIG. 2A illustrates a schematic, logical view of the hierarchical relationship between mesh access points and a controller.

FIG. 2A illustrates the logical relationship between mesh access points and controller 20 relative to wireless clients, according to one possible implementation of the invention. In one implementation, the mesh access points, in connection with the controller 20, implement a hierarchical processing scheme for management of wireless connections with clients 60. For example, each mesh access point may be configured to autonomously implement time-critical link layer functions (such as transmitting acknowledgements), while encapsulating and forwarding wireless management frames (e.g., association requests, etc.) and other client traffic to controller 20 for processing. The encapsulated frames may traverse one or more intermediate mesh access points in the mesh hierarchy as indicated by FIG. 2A.

In other implementations, the controller 20 may be implemented as a wireless domain server (WDS). If the controller 20 is implemented as a WDS, the client side access functionality implemented by the mesh access points may comprise autonomous or so-called "fat" wireless access points. Of course, a variety of other mesh routing and control schemes can be used in connection with the real-time transport protocol described herein.

Figure 2B:
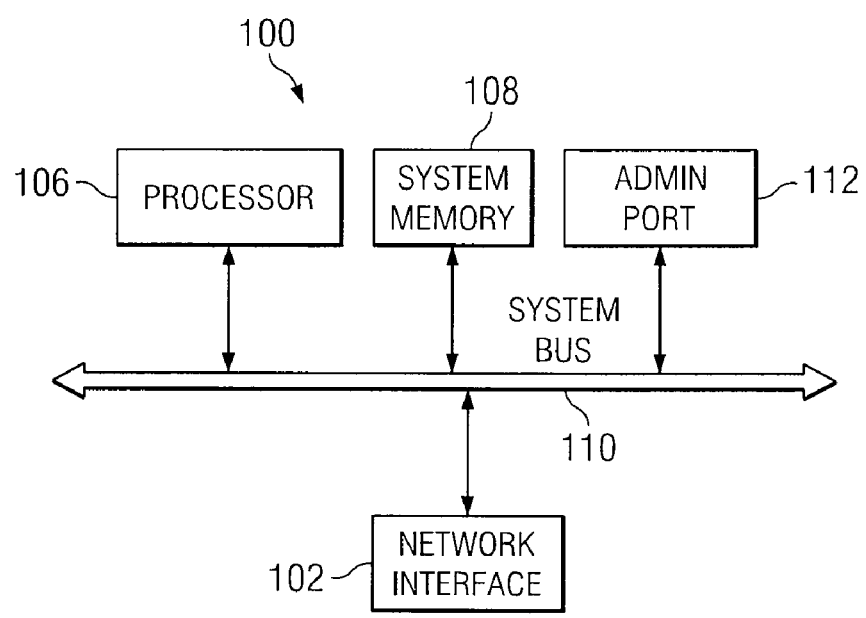
FIG. 2B illustrates an example hardware system, which may be used to implement a controller.

FIG. 2B illustrates an example hardware system 100, which may be used to implement a controller 20. As FIG. 2B shows, in one implementation, the central controller 20 includes a network interface 102. Controller 20, in one implementation, further comprises a processor 106, a memory 108, one or more software modules stored in memory 108, including instructions for performing the functions described herein, and a system bus 110 operably connecting these components. The controller may optionally include an administrative port 112 allowing for administrative access for such purposes as configuration and diagnostic access.

B.3. Wireless Mesh Access Point

Figure 3A:
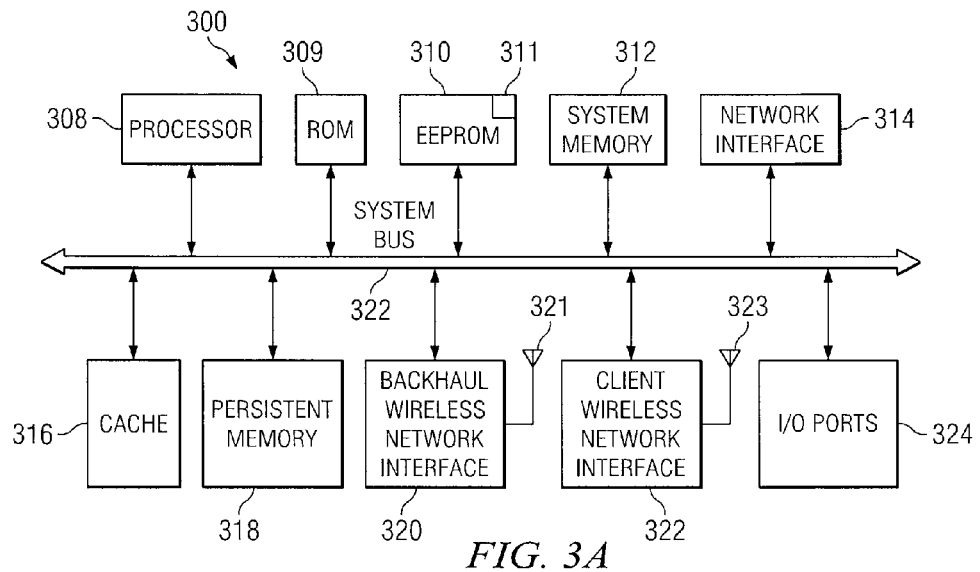
FIG. 3A illustrates for didactic purposes a hardware system 300, which may be used to implement a mesh access point.

FIG. 3A illustrates for didactic purposes a hardware system 300, which may be used to implement a wireless mesh access point in a wireless mesh network. In one implementation, the wireless mesh access point 300 comprises a processor 308, a read-only memory (ROM) 309, and an electronically erasable read-only memory (EEPROM) 311 including reserved memory space 311 for storing network management information including physical environment and parameter (PEP) information. PEP information may include, for example, antenna orientation, global positioning system (GPS) position, altitude, and height above the ground, etc. The wireless mesh access point 300 may also include one or more of the following: a memory 312, a network interface 314 (e.g., an 802.3 interface) for communication with a LAN, a cache 316 for storing WLAN information, and a persistent memory 318. The wireless mesh access point 300 may also include a backhaul wireless network interface 320 having an antenna 321. Backhaul wireless network interface 320 is configured to transmit and receive messages to/from one or more other wireless mesh access points in a mesh network. The wireless mesh access point 300 may also include a client wireless network interface 322 (e.g., an IEEE 802.11 WLAN interface) having an antenna 323. Client wireless network interface 322 is configured for wireless communication with one or more wireless clients 60. The wireless mesh access point 300 may also include and a system bus 322 interconnecting these components, input/output (I/O) ports 324, and an optional administration or control port (326).

In some implementations, wireless mesh access point use one or more of the following standards: WiFi/802.11, WiMax/802.16, 2G, 3G, or 4G Wireless, Bluetooth/802.15, Zigbee, or any other suitable wireless communication standards. In one implementation, wireless mesh access point may have a separate access radio, and associated interface components, for communicating with a wireless client or other portable computer. The wireless mesh access points may also include software modules, including Dynamic Host Configuration Protocol (DHCP) clients, transparent bridging, Lightweight Access Point Protocol (LWAPP), Cisco® Discovery Protocol (CDP) modules, wireless access point modules, Simple Network Management Protocol (SNMP) functionality, etc., and device drivers (e.g., network and WLAN interface drivers) stored in persistent memory 318 (e.g., a hard disk drive, flash memory, EEPROM, etc.). At start up, these software components are loaded into system memory 312 and then accessed and executed by processor 310. In one implementation, the wireless mesh access point includes software or firmware modules for recognizing the reception of network management information (e.g., PEP data) and for storing such information in memory (e.g., EEPROM 310).

Figure 3B:
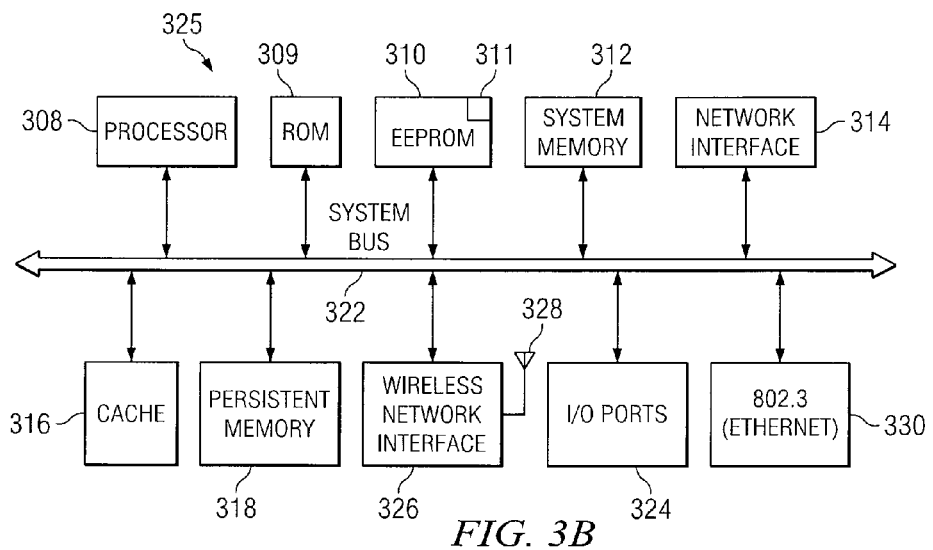
FIG. 3B illustrates for didactic purposes a hardware system 325, which may be used to implement a mesh access point in accordance with another implementation.

FIG. 3B illustrates for didactic purposes a hardware system 325, which may be used to implement a wireless mesh access point in a wireless mesh network, in accordance with another implementation. In one implementation, the wireless mesh access point 325 may have similar components to that of wireless mesh access point 300 of FIG. 3A except that wireless mesh access point 325 of FIG. 3B includes wireless network interface 326 and antenna 328 instead of backhaul wireless network interface 320, antenna 321, client wireless network interface 322, and antenna 323. Furthermore, wireless mesh access point 325 also includes an 802.3 (Ethernet) interface 330.

One or more of the wireless mesh access points may further include a battery or other rechargeable power supply. One or more of the wireless mesh access points may further be operably attached to a mechanism that recharges this power supply, such as a solar module.

C. Path Selection

Existing mesh path selection protocols assume all devices in the mesh network are in an active mode at all times. Examples include routing protocols defined in 802.11s, such as Hybrid Wireless Mesh Protocol (HWMP) and Radio Aware Optimized Link State Routing (RA-OLSR). However, given the self-forming and self-healing nature of mesh networks, a device in Power Save (PS) mode can be woken up and participate in the mesh network again. Therefore, when a mesh access point does not expect to send or receive wireless traffic, it does not need to be in the active state and can enter a doze state to conserve battery-life.

Figure 4:
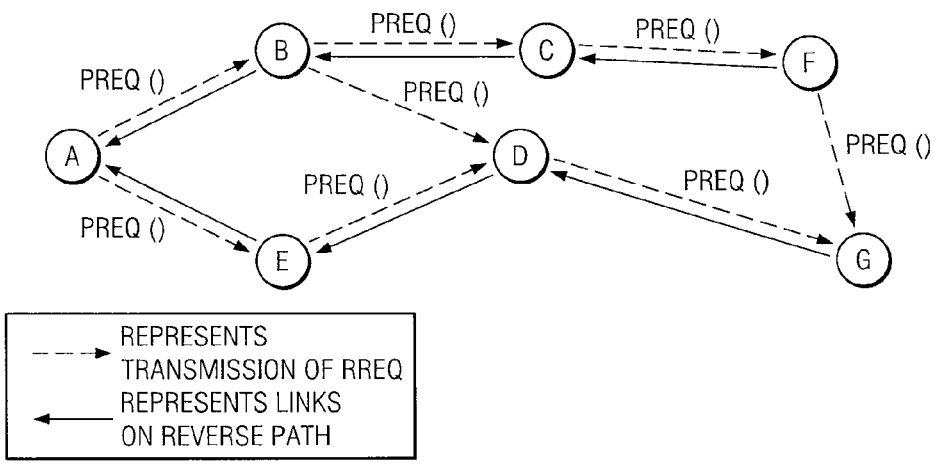
FIG. 4 is a schematic diagram illustrating a message flow involving path discovery according to one implementation of the invention.
Figure 5:
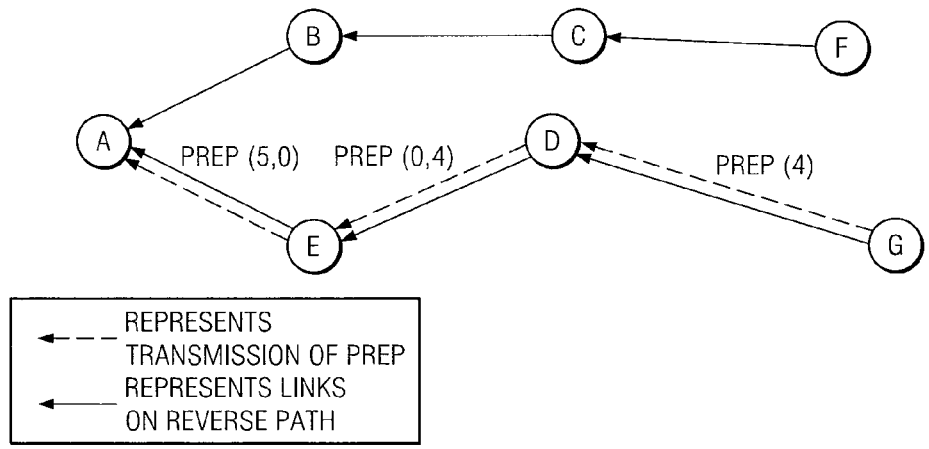
FIG. 5 is a schematic diagram illustrating a message flow involving path discovery according to one implementation of the invention.

FIGS. 4 and 5 illustrate a message flow according to which a source node may learn a route to a destination node in a wireless mesh network. In one implementation, a source node (here, node A) may learn a route to a destination node (here, Node G) in a mesh by broadcasting Path Request (PREQ) messages that identify the destination node. Other nodes in the path to the destination node may append an identifier (such as a wireless MAC address) and/or increment a hop count value and re-broadcast (or unicast to nodes in Power Save mode) the PREQ message. When the PREQ messages reach the destination node, the destination node can examine hop count, node identifiers, and possibly other information in the messages, to select a path back to the source node. As FIG. 5 illustrates, the destination node G may then transmit a unicast PREP back to the source node A along the selected path.

As currently defined in the IEEE 802.11s standard, however, the power management function and the path selection function are two independent functions with no interaction. The scheme introduced here seeks to bridge the gap between power management and path selection to promote packet delivery reliability, network stability, and to reduce power consumption.

To facilitate information exchange between path selection and power management, a message or information element, transmitted between nodes, that includes power state information can be utilized. For example, in one implementation, two more bits can be defined in a mesh configuration information element (IE): a "Battery-Powered" bit and a "Critical Battery State" bit. Mesh configuration IEs may be appended to wireless frames transmitted to neighboring mesh nodes as part of neighbor discovery and maintenance mechanisms. The "Battery-Powered" bit is used to differentiate whether a transmitting mesh node in Power Save mode is battery-powered or outlet-powered. Mesh access points exchange mesh configuration information during peer link set up to ensure that each mesh access point knows which of its peer mesh access points are battery-powered and which are not. Battery-powered PS mesh access points can be treated differently from outlet powered PS mesh access points during the path selection process. The "Critical Battery State" bit is set when a mesh access point is in critical battery state and does not wish to participate in forwarding. However, this mesh access point can still maintain peer links with one or more neighbors and can participate in path selection as a source or destination node. Using these two extra bits, mesh access points can be classified into three categories: 1) outlet-powered, 2) battery-powered but not in critical battery state, 3) battery-powered and in critical battery state. Note that these two bits can also be combined together to classify mesh access points—for instance: a) Outlet powered (00); b) Battery powered but not in critical battery state (01); c) Battery powered and in critical battery state (10); and d) Reserved (11).

The decision for a mesh access point to go into Power Save mode can be triggered by at least three events: 1) in the case of proactive routing, the mesh access point has not sent or received any traffic for a certain period of time, for instance, after an idle timer has expired; 2) in the case of on-demand routing mode, there is no active route going through this mesh access point; and 3) the mesh access point's battery power is in a critical state and the mesh access point does not have its own traffic to send. Before a mesh access point goes into Power Save mode, it shall inform each of its peer mesh access points of its intention to go into Power Save mode and forward all the packets that still remain in its queues. The neighboring mesh access points store this power state information to determine whether the mesh access point requires that it be woken up before packets can be transmitted to it. Further, the "Critical-battery" bit may be used in the wireless frame exchange between the mesh access point and its peer mesh access points to identify the third triggering event of the Power Save mode. For instance, a "Critical-battery" bit can be defined in the mesh header in addition to the mesh configuration IE. Note that the mesh configuration IE can be included in beacons and peer link setup messages, whereas the mesh header can be included in every data packet. If the mesh access point is in critical battery state, the mesh access point sets the "Critical-battery" bit in the mesh header to 1. This is to notify its peer mesh access points that it will not become an intermediate node and participate in forwarding. However, if the mesh access point chooses to maintain peer links with its neighbors, it can still act as a source or a destination node in the path selection process.

To ensure that a route to a destination node can still be set up when one or more battery-powered devices along the route is in Power Save mode, a two-phase path selection procedure can be defined as follows.

Phase 1 (Only Main-Powered PS Mesh Access Points are Woken Up):

During phase 1, only outlet-powered PS mesh access points are woken up to participate in the path selection process. The reason is that in a multihop mesh network, forwarding traffic consumes significantly more power than just sending one's own traffic. Therefore, if a path can be found without using battery-powered devices, such a path should be chosen.

A wakeup bit is defined in the Path Request (PREQ) message. When the packet is propagated to the network for the first time, the bit is set to 0, indicating battery-powered devices in PS mode shall not be woken up. At each hop, upon receiving PREQ message, a mesh access point immediately broadcasts it to its neighboring mesh access points. Note that because devices in PS mode only wake up during an Announcement Traffic Indication Message (ATIM) window, they will not receive the PREQ message. Thus, the mesh access point also unicasts the PREQ message to nodes currently in the Power Save mode that are not battery powered after waking them up during the ATIM window. The battery-powered PS nodes are not woken up during this first phase and do not need to rebroadcast or otherwise propagate the PREQ message. Of course, when the battery-powered PS device is the destination node, it is woken up to receive the PREQ message and sends back a path response message (PREP) to the source node.

Phase 2 (Battery-Powered PS Mesh Access Points are Woken Up):

If no valid route is found after a route discovery timer expires, the source node may resend the PREQ message up to N times. If there is still no valid route after the Nth retry, the source node sets the wakeup bit in the PREQ message to 1 and re-initiates the route discovery procedure. At each hop, a mesh access point will broadcast the route discovery packet once to all active devices and then uni-cast the PREQ packet to each of its peer mesh access points in the Power Save state, except those nodes in critical battery state, after notifying them during the ATIM window. Note that wireless mesh access points in power save mode and in critical battery state shall not be woken up unless they are the destination node of the path. Once the destination node or an intermediate node with a valid route to the destination receives the PREQ with the wakeup bit set to 1, it unicasts a Path Response (PREP) message with the wakeup bit set to 1 back to the source node.

Figure 6:
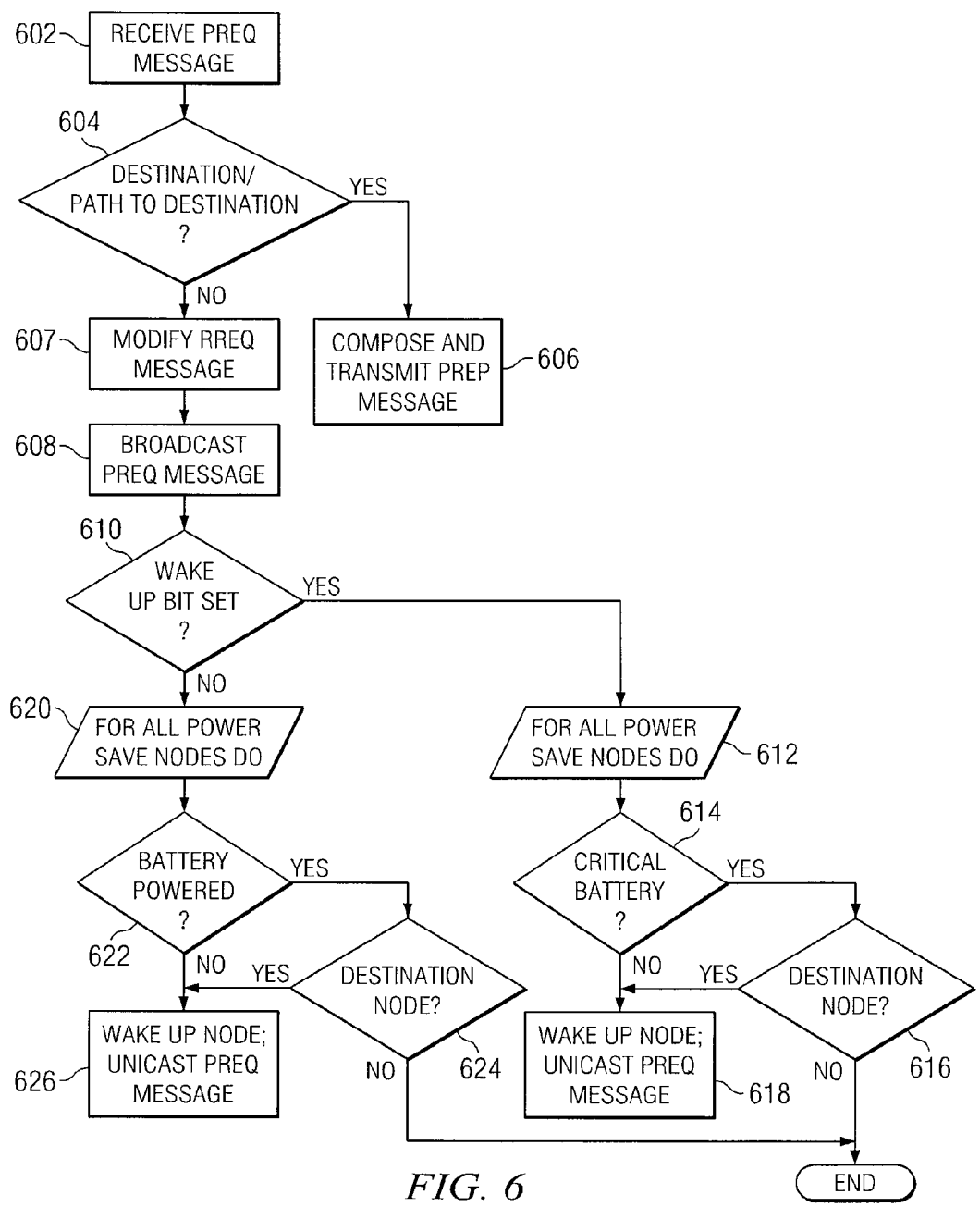
FIG. 6 is a flow chart setting forth a method for selectively propagating route discovery messages within a wireless mesh network.

FIG. 6 illustrates a process flow for selectively propagating path discovery messages in a wireless mesh network in a manner responsive to the power state of peer nodes. As FIG. 6 shows, when a mesh access point receives a PREQ message (602), it determines whether it is the destination node identified in the message or has a valid route to the destination node (604). If so, the mesh access point unicasts a PREP message back to the source node (606), setting the wake up bit in the PREP message equal to the wake up bit in the PREQ message. If not, the mesh access point selectively propagates the PREQ message to its peer nodes. In one implementation, the mesh access point may modify the PREQ message, adding an access point identifier and incrementing a hop count value in the message (607), and broadcasts the PREQ message, which is detected by its currently active peer mesh nodes (608). If any peer nodes are currently power save state (609), the mesh access point then accesses the wake up bit in the PREQ message to determine whether it is set (610). If the wake up bit is not set, the mesh access point wakes up all outlet-powered nodes in the power save state and unicasts the PREQ message to the peer node(s) (620, 622, 626). In addition, if a peer node in power save state is the destination node identified in the PREQ message (624), the mesh access point also wakes up that peer node and unicasts the PREQ message to it (626). On the other hand, if the wake up bit in the PREQ message has been set, the mesh access point wakes up all peer nodes in the power save state that are not reporting a critical battery state and unicasts the PREQ message to the peer node(s) (612, 614, 618). As above, the mesh access point also determines whether a peer mesh node is the destination node (616) in order to wake up the peer node and unicast the PREQ message to it (618).

The default HWMP radio-aware metric of IEEE 802.11s can still be used with the above-described two-phased route discovery procedure. In this case, if multiple PREQs are received from multiple routes, the destination node makes a decision as to which route to choose based on the radio-aware metric. Note that because embodiments of the invention differentiate outlet-powered devices and battery-powered devices in the two-phased route discovery process, battery-powered mesh access points can be chosen only when a valid route cannot be found with only outlet-powered devices. The default routing metric can also be replaced with a metric that takes battery state of one or more nodes along a path into consideration. Each battery-powered mesh access point updates the routing metric based on its remaining battery. If multiple routes are discovered at the second phase of the route discovery process, the destination node chooses a route with the best battery metric.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited to the embodiments described above.

What is claimed is:

1. A method performed by an apparatus comprising:
maintaining power state information for one or more neighboring wireless mesh nodes,
wherein the power state information for each of the neighboring wireless mesh nodes comprises whether the wireless mesh node is a battery-powered device, whether the wireless mesh node is in a power save state, and whether the wireless mesh node is in a critical battery state;
receiving a path request message from a first wireless mesh node, wherein the path request message identifies a source node and a destination node;
propagating the path request message to selected ones of the one or more neighboring wireless mesh nodes based on the power state information corresponding to the one or more neighboring wireless mesh nodes, by:
propagating the path request message to first ones of the one or more neighboring wireless mesh nodes that are not in the power save state;
if a valid route is not yet found between the source node and the destination node, then:
waking up second ones of the one or more neighboring wireless mesh nodes that are in the power save state and are outlet powered;
propagating the path request message to the second ones of the one or more neighboring wireless mesh nodes; and
if a valid route is not yet found between the source node and the destination node, then:
waking up third ones of the one or more neighboring wireless mesh nodes that are in the power save state and are battery powered and are not in the critical battery state; and
propagating the path request message to the third ones of the one or more neighboring wireless mesh nodes.

2. The method of claim 1 wherein propagating the path request message comprises
broadcasting the path request message; and
selectively unicasting the path request message to neighboring wireless mesh nodes in a power save state.

3. The method of claim 1 wherein propagating the path request message comprises
broadcasting the path request message; and
responsive to a wake-up indication in the path request message, selectively unicasting the path request message to neighboring wireless mesh nodes in a power save state, if the neighboring wireless mesh nodes in the power save state are not in a critical battery state;
responsive to absence of a wake-up indication in the path request message, selectively unicasting the path request message to neighboring wireless mesh nodes in a power save state, if the neighboring wireless mesh nodes in the power save state are not battery-powered; and unicasting the path request message to a neighboring wireless mesh node if the neighboring wireless mesh node is the destination node identified in the path request message.

4. The method of claim 1 further comprising adding a wireless mesh node identifier to the path request message.

5. The method of claim 1 wherein the path request message comprises a hop count value, and wherein the method further comprises incrementing the hop count value of the path request message prior to propagating the path request message.

6. The method of claim 1 further comprising determining, responsive to the path request message, whether a valid path to the destination node exists; and transmitting a unicast path response message to the source node identified in the path request message.

7. The method of claim 1 further comprising monitoring state of a battery power supply;

notifying one or more peer wireless mesh nodes of a critical battery state when the state of the battery power supply enters a threshold condition; and entering a power save state.

8. An apparatus comprising:

one or more wireless network interfaces;

a memory;

one or more processors;

a wireless mesh access point module comprising computer-readable instructions operative to cause the one or more processors to:

maintain, in the memory, power state information for one or more neighboring wireless mesh nodes, wherein the power state information for each of the neighboring wireless mesh nodes comprises whether the wireless mesh node is a battery-powered device, whether the wireless mesh node is in a power save state, and whether the wireless mesh node is in a critical battery state;

receive a path request message from a first wireless mesh node, wherein the path request message identifies a source node and a destination node;

propagate the path request message to selected ones of the one or more neighboring wireless mesh nodes based on the power state information corresponding to the one or more neighboring wireless mesh nodes, by:

propagating the path request message to first ones of the one or more neighboring wireless mesh nodes that are not in the power save state;

if a valid route is not yet found between the source node and the destination node, then:

waking up second ones of the one or more neighboring wireless mesh nodes that are in the power save state and are outlet powered;

propagating the path request message to the second ones of the one or more neighboring wireless mesh nodes; and if a valid route is not yet found between the source node and the destination node, then:

waking up third ones of the one or more neighboring wireless mesh nodes that are in the power save state and are battery powered and are not in the critical battery state; and propagating the path request message to the third ones of the one or more neighboring wireless mesh nodes.

9. The apparatus of claim 8 wherein the wireless mesh access point module further comprises computer-readable instructions for propagating the path request message operable to cause the one or more processors to broadcast the path request message; and selectively unicast the path request message to neighboring wireless mesh nodes in a power save state.

10. The apparatus of claim 8 wherein the wireless mesh access point module further comprises computer-readable instructions for propagating the path request message operable to cause the one or more processors to broadcast the path request message; and responsive to a wake-up indication in the path request message, selectively unicast the path request message to neighboring wireless mesh nodes in a power save state, if the neighboring wireless mesh nodes in the power save state are not in a critical battery state;

responsive to absence of a wake-up indication in the path request message, selectively unicast the path request message to neighboring wireless mesh nodes in a power save state, if the neighboring wireless mesh nodes in the power save state are not battery-powered; and unicast the path request message to a neighboring wireless mesh node if the neighboring wireless mesh node is the destination node identified in the path request message.

11. The apparatus of claim 8 wherein the wireless mesh access point module further comprises computer-readable instructions for propagating the path request message operable to cause the one or more processors to add a mesh node identifier to the path request message.

12. The apparatus of claim 8 wherein the path request message comprises a hop count value, and wherein the wireless mesh access point module further comprises computer-readable instructions operable to cause the one or more processes to increment the hop count value of the path request message prior to propagating the path request message.

13. The apparatus of claim 8 wherein the wireless mesh access point module further comprises computer-readable instructions operable to cause the one or more processes to determine, responsive to the path request message, whether a valid path to the destination node exists; and transmit a unicast path response message to the source node identified in the path request message.

14. The apparatus of claim 8 further comprising a battery power supply; and wherein the wireless mesh access point module further comprises computer-readable instructions operable to cause the one or more processes to monitor state of the battery power supply;

notify one or more peer wireless mesh nodes of a critical battery state when the state of the battery power supply enters a threshold condition; and enter a power save state.

15. One or more computer-readable non-transitory storage media embodying software operable when executed by one or more computer systems to:

maintain power state information for one or more neighboring wireless mesh nodes, wherein the power state information for each of the neighboring wireless mesh nodes comprises whether the wireless mesh node is a battery-powered device, whether the wireless mesh node is in a power save state, and whether the wireless mesh node is in a critical battery state;

receive a path request message from a first wireless mesh node, wherein the path request message identifies a source node and a destination node;

propagate the path request message to selected ones of the one or more neighboring wireless mesh nodes based on the power state information corresponding to the one or more neighboring wireless mesh nodes, by:
    propagating the path request message to first ones of the one or more neighboring wireless mesh nodes that are not in the power save state;
    if a valid route is not yet found between the source node and the destination node, then:
        waking up second ones of the one or more neighboring wireless mesh nodes that are in the power save state and are outlet powered;
        propagating the path request message to the second ones of the one or more neighboring wireless mesh nodes; and
        if a valid route is not yet found between the source node and the destination node, then:
            waking up third ones of the one or more neighboring wireless mesh nodes that are in the power save state and are battery powered and are not in the critical battery state; and
            propagating the path request message to the third ones of the one or more neighboring wireless mesh nodes.

16. The media of claim 15 wherein, for propagating the path request message, the logic is further operable to
    broadcast the path request message; and
    selectively unicast the path request message to neighboring wireless mesh nodes in a power save state.

17. The media of claim 15 wherein, for propagating the path request message, the media is further operable to
    broadcast the path request message; and
    responsive to a wake-up indication in the path request message, selectively unicast the path request message to neighboring wireless mesh nodes in a power save state, if the neighboring wireless mesh nodes in the power save state are not in a critical battery state;
    responsive to absence of a wake-up indication in the path request message, selectively unicast the path request message to neighboring wireless mesh nodes in a power save state, if the neighboring wireless mesh nodes in the power save state are not battery-powered; and
    unicast the path request message to a neighboring wireless mesh node if the neighboring wireless mesh node is the destination node identified in the path request message.

18. The media of claim 15 wherein, for propagating the path request message, the media is further operable to add a mesh node identifier to the path request message.

19. The media of claim 15 wherein, for propagating the path request message, the media is further operable to increment the hop count value of the path request message prior to propagating the path request message.

20. The media of claim 15 wherein the media is further operable to
    determine, responsive to the path request message, whether a valid path to the destination node exists; and
    transmit a unicast path response message to the source node identified in the path request message.

21. The media of claim 15 wherein the media is further operable to
    monitor state of a battery power supply;
    notify one or more peer wireless mesh nodes of a critical battery state when the state of the battery power supply enters a threshold condition; and
    enter a power save state.

22. A system comprising:
a plurality of wireless mesh access points, wherein one or more of the plurality of wireless mesh access points comprise:
one or more wireless network interfaces;
a memory;
one or more processors;
a wireless mesh access point module comprising computer-readable instructions operative to cause the one or more processors to:
    maintain, in the memory, power state information for one or more neighboring wireless mesh access points, wherein the power state information for each of the neighboring wireless mesh access points comprises whether the wireless mesh access point is a battery-powered device, whether the wireless mesh access point is in a power save state, and whether the wireless mesh access point is in a critical battery state;
    receive a path request message from a first wireless mesh access point, wherein the path request message identifies a source node and a destination node;
    propagate the path request message to selected ones of the one or more neighboring wireless mesh access points based on the power state information corresponding to the one or more neighboring wireless mesh access points, by:
        propagating the path request message to first ones of the one or more neighboring wireless mesh nodes that are not in the power save state;
        if a valid route is not yet found between the source node and the destination node, then:
            waking up second ones of the one or more neighboring wireless mesh nodes that are in the power save state and are outlet powered;
            propagating the path request message to the second ones of the one or more neighboring wireless mesh nodes; and
            if a valid route is not yet found between the source node and the destination node, then:
                waking up third ones of the one or more neighboring wireless mesh nodes that are in the power save state and are battery powered and are not in the critical battery state; and
                propagating the path request message to the third ones of the one or more neighboring wireless mesh nodes;
    broadcast one or more path discovery messages to one or more wireless mesh access points in a mesh network to discover routes to destination nodes, wherein the path discovery messages include a wake up indication that is cleared;
if no responses to the one or more path discovery messages are received that identify a valid route to a given destination node, broadcast one or more additional path discovery messages to the one or more wireless mesh access points in the mesh network, wherein the one or more additional path discovery messages include a wake up indication that is set to cause the neighboring wireless mesh access points to wake up one or more peer wireless mesh access points in a power save mode and propagate the path discovery messages to them.

* * * * *